United States Patent
Ferguson, deceased

Patent Number: 5,174,582
Date of Patent: Dec. 29, 1992

[54] SPRUNG BRUSH SEALS

[75] Inventor: John G. Ferguson, deceased, late of Stroud, England, by Judith A. Ferguson, executrix

[73] Assignee: Rolls-Royce plc, London, England

[21] Appl. No.: 804,061

[22] Filed: Dec. 9, 1991

[30] Foreign Application Priority Data

Dec. 12, 1990 [GB] United Kingdom ............... 9026977

[51] Int. Cl.$^5$ ............................................. F16J 15/447
[52] U.S. Cl. ...................................... 277/53; 277/55; 415/174.5
[58] Field of Search ....................... 277/53, 54, 55, 56, 277/57, 192, 193, 195; 415/173.5, 174.5

[56] References Cited

U.S. PATENT DOCUMENTS

| | | | |
|---|---|---|---|
| 4,358,120 | 11/1982 | Moore | 277/53 X |
| 5,026,252 | 6/1991 | Hoffelner | 277/53 X |
| 5,066,024 | 11/1991 | Reisinger et al. | 277/53 |
| 5,090,710 | 2/1992 | Flower | 277/53 |

FOREIGN PATENT DOCUMENTS

| | | | |
|---|---|---|---|
| 0439367 | 12/1935 | United Kingdom | 277/53 |
| 2021210A | 11/1979 | United Kingdom | . |
| 2191825A | 12/1987 | United Kingdom | . |

Primary Examiner—William A. Cuchlinski, Jr.
Assistant Examiner—James K. Folker
Attorney, Agent, or Firm—Oliff & Berridge

[57] ABSTRACT

A brush seal is formed by bristles tightly packed between two annular sideplates having different inner radii and secured to a housing. The free ends of the bristles are in rubbing contact with a shaft. The differential pressure which the seal can support is increased by loading the bristles against the annular sideplate having the smaller inner radius, the loading force being such that the bristles can still move in the plane of the seal. As a result the amount of relative movement of shaft and housing that the seal can tolerate is not reduced.

5 Claims, 2 Drawing Sheets

SPRUNG BRUSH SEALS

FIELD OF THE INVENTION

This invention relates to brush seals.

Brush seals are a well known method of maintaining a fluid seal between two members which move relative to one another.

BACKGROUND OF THE INVENTION

A brush seal of the prior art will now be described with reference to FIGS. 1A, 1B, 1C and 2 of the accompanying diagrammatic drawings, in which, FIG. 1A is a view of the prior art brush seal taken along its axis of rotation, FIG. 1B is a cross section of the brush seal of FIG. 1A taken along line X—X, and FIGS. 1C and 2 are views of FIG. 1B showing the brush seal undergoing different types of distortion.

In FIG. 1A a large number of tightly packed bristles 1 are shown secured between a pair of annular sideplates 2,3 which are attached to a fixed housing 4. The free ends 5 of the bristles 1 are in rubbing contact with the surface of a shaft 6 which rotates relative to the housing 4.

As a result of the tight packing of the bristles and their rubbing contact with the shaft fluid leakage through the seal is low.

If the shaft 6 moves relative to the housing 4 the bristles 1 bend elastically in the plane of the seal to accommodate this movement returning to their original positions as the shaft moves back. Clearly the longer the bristles 1 are the greater the degree of movement of the shaft 6 so they will be able to accommodate without any of the bristles losing contact with the surface of the shaft 6 and reducing the quality of the seal.

If there is a pressure difference across the seal the pressure will exert a force on the bristles 1 which will cause them to bend along the axis of the shaft 6 towards the low pressure side as shown in figure 1B.

If the differential pressure across the seal is high enough the bristles 1 will bend so far that they lose contact with the surface of the shaft 6 and the seal will fail. The longer the bristles 1 are the larger the pressure forces on them and the degree of bending they suffer will be for a given differential pressure. As a result, the longer the bristles are the lower the pressure at which the seal will fail.

In order to overcome the problem that longer bristles for increased tolerance of movement will reduce the maximum differential pressure the seal can withstand annular sideplates 2,3 are arranged to have different inner radii.

The annular sideplate 2 on the high pressure side of the seal has a larger inner radius than the annular sideplate 3 on the low pressure side of the seal. As a result the bending of the bristles 1 due to the differential pressure across the seal is reduced because the bristles 1 are supported by the sideplate 3, and the ability of the bristles 1 to accommodate movement of the shaft 6 relative to the housing 4 is unchanged because the bristles 1 can bend in the plane of the seal from the edge of the sideplate 2.

Unfortunately there is still a problem with this arrangement. When a differential pressure is applied across the seal the bristles 1 bend towards the lower pressure side of the seal and as a result they protrude between the sideplate 3 and the shaft 6. As a result movement of the shaft 6 towards the housing 4 can result in some of the bristles 1 being pinched between the shaft 6 and the sideplate and bending perpendicular to the plane of the seal instead of in the plane of the seal, as shown in figure 1C. This can cause these bristles 1 to bend so sharply that they snap or plastically deform, degrading the quality of the seal.

The basis of this invention is the realisation that a bristle of a brush seal of the type shown in figure 1A bends as cantilever which is supported where the bristle is held between the two sideplates and where it bends over the end of the sideplate with the smaller inner diameter.

For example, looking at FIG. 2 a seal is formed between a housing 4 and a shaft 6 by a plurality of bristles 1 secured between a pair of sideplates 2,3 as before. In order to reduce the degree of pressure induced bending of the bristles 1 when a differential pressure is applied across the seal the sideplate 3 on the low pressure side of the seal has a smaller internal diameter than the sideplate 2 on the high pressure side.

It has been found that when a differential pressure is applied across the seal the bristles bend as a cantilever. That is the bristles 1 bend from the edge of the sideplate 2 with the larger inner radius towards the high pressure side of the seal, then curve back towards the low pressure side of the seal and are supported by the sideplate 3 having the lower inner radius at its inner edge 7 and then project towards the low pressure side of the seal between the sideplate 3 and the shaft 6. As a result the bristles 1 are not in contact with the sealplate 3 in the region 8 between the inner edge of the sealplate 2 and the inner edge 7 of the sealplate 3.

SUMMARY OF THE INVENTION

Accordingly, in order to at least partially overcome these problems, this invention provides a brush seal comprising: first and second spaced apart members able to move relative to one another and defining between them a fluid flow channel; first and second sideplates attached to the first member, and extending towards the second member, the first sideplate extending further than the second sideplate towards the second member; a plurality of closely-packed bristles each having a first end secured between the two sideplates and a second end in contact with the second member so as to block fluid flow along said channel, and a loading element arranged to urge a number of the bristles against the first sideplate with a force such that the bristles can still slide between the first sideplate and the element.

Therefore, by the invention, if a force is applied to the bristles 1 to urge them towards the sealplate 3 in the region 8 this will reduce the amount by which the bristles 1 protrude between the sideplate 3 and the shaft 6.

Figure 1A:
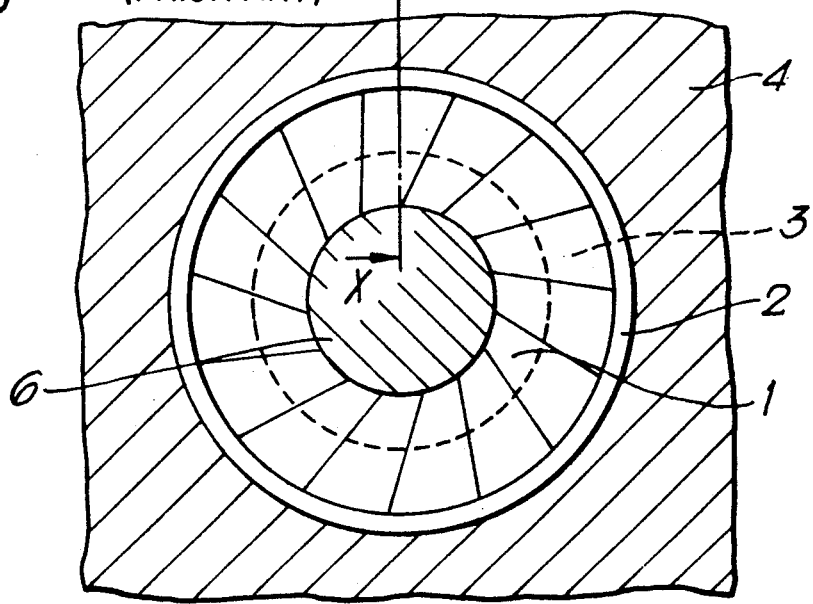
FIGS. 1A, 1B, 1C, and 2 show a prior art brush seal as previously described.
Figure 1B:
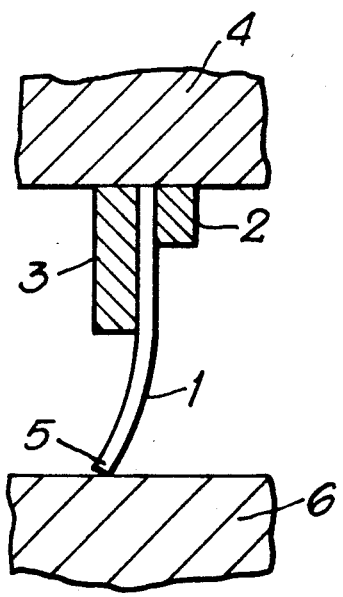
Figure 1C:
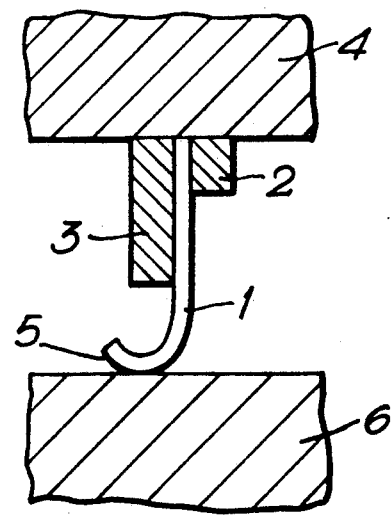
Figure 2:
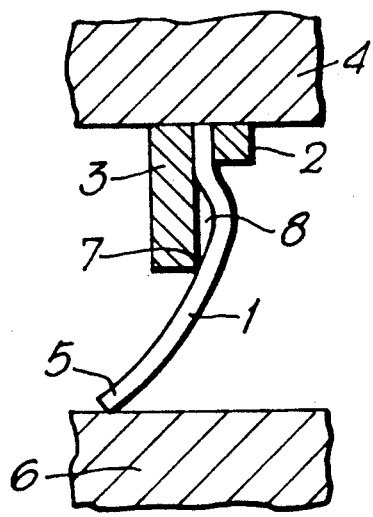
Figure 3B:
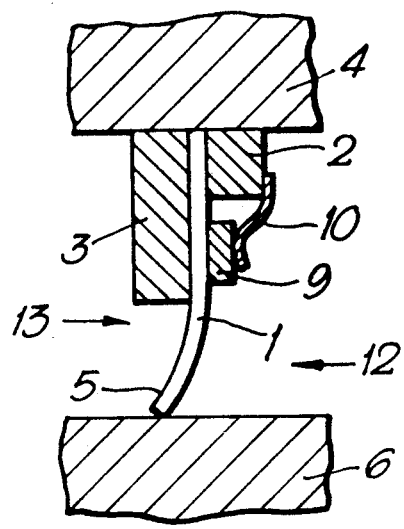
Figure 3A:
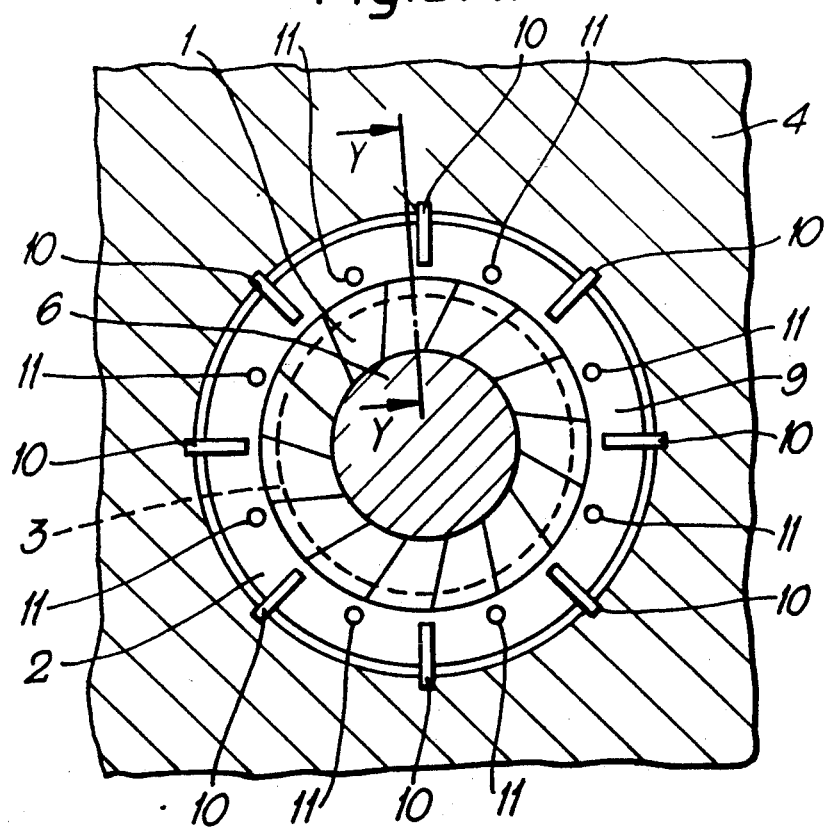

A seal according to the invention will now be described by way of example only with reference to diagrammatic FIGS. 3A and 3B of the accompanying drawings in which;

FIG. 3A shows a rotary brush seal employing the invention; and

FIG. 3B shows a cross section along the line Y-Y in FIG. 3A, identical parts having the same reference numerals throughout.

SPECIFIC DESCRIPTION

Referring to FIGS. 3A and 3B, a seal between a housing 4 and a shaft 6 is formed by a plurality of tightly packed bristles 1 and has a differential pressure across it. A first fluid 12 under a high pressure being on one side of the seal, and a second fluid 13 at a lower pressure being on the other side of the seal. All of the bristles 1 are the same length. A pair of annular sideplates 2 and 3 are attached to the housing 4 and hold the bristles 1 between them. The free ends 5 of the bristles 1 are in rubbing contact with the shaft 6.

The annular sideplate 2 is on the side of the bristles 1 exposed to the high pressure fluid 12 and the annular sideplate 3 is on the side of the bristles 1 exposed to the low pressure fluid 13. The two annular sideplates 2 and 3 are coaxial and have different inner radii, the annular sideplate 2 on the high pressure side of the bristles 1 has a larger inner radius than the annular sideplate 3 on the low pressure side of the bristles 1.

On the high pressure side of the bristles 1 is an annular loading ring 9. The annular loading ring 9 is coaxial with the two sideplates 2 and 3. The outer radius of the loading ring 9 is slightly smaller than the inner radius of the sideplate 2 and the inner radius of the loading ring 9 is slightly larger than the inner radius of the sideplate 3.

The loading ring 9 is positioned on the high pressure side of the bristles 1 coplanar with the sideplate 2 and is urged against the bristles 1 by spring biasing by eight spring fingers 10 symmetrically spaced around the sideplate 2. Each of the spring fingers 10 has a first end 11 secured to the sideplate 2 and a second free end 12 in contact with the loading ring 9 which urges the loading ring 9 against the bristles 1.

As a result the loading ring 9 exerts an axial load on the bristles 1, urging them against the sideplate 3.

As explained above the load urging the bristles 1 towards the sideplate 3 reduces the distance that the bristles 1 project axially into the region containing the low pressure fluid 13.

The loading ring 9 has a larger inner radius than the sideplate 3 in order to allow the bristles to move more freely in the plane of the seal because the bristles 1 may splay out slightly and this would make it difficult for them to move between the sideplate 3 and the loading ring 9 if they had the same inner radius.

The spring fingers 10 are arranged so that the load exerted on the bristles 1 by the loading ring 9, pinching them between the loading ring 9 and the sideplate 3, is low enough that the bristles 1 are able to slide between the loading ring 9 and the sideplate 3 in the plane of the seal in order to accommodate movement of the shaft 6 relative to the housing 4.

The loading ring 9 has eight holes 11 which pass right through the loading ring 9 symmetrically spaced around it.

The holes 11 equalize the pressure on the two sides of the loading ring 9. If the holes 11 were not present the leakage of fluid under pressure between the bristles 1 might result in a differential pressure being generated across the loading ring 9, the side in contact with the bristles 1 being exposed to a lower pressure than the other. If this occurred the sealing ring 9 would exert an additional pressure generated force on the bristles 1. This could result in the bristles 1 being held between the sideplate 3 and the loading ring 9 with enough force to prevent movement of the bristles 1 in the plane of the seal, reducing the ability of the bristles 1 to accommodate relative movements of the shaft 6 and the housing 4.

The loading ring 9 could be formed from a plurality of segments, each exerting a load on a proportion of the bristles 1.

Other methods of loading the loading ring 9 such as a conical spring or circular coil spring could be used, or the spring biasing means and loading ring 9 could be formed as a unitary structure. It would even be possible to have the sideplate 2, loading ring 9 and spring biasing means 11 all formed as a unitary structure.

The number of spring fingers 10 and holes 11 may be varied as is found convenient in practice.

The use of holes 11 is not essential, but is preferred.

The invention can, of course, be applied to a linear brush seal, employing a loading strip in place of a loading ring 9.

Either or both, sideplates 2,3 could be formed as surface features of the housing 4 rather than separate elements if preferred.

It is not essential that the loading ring 9 has a larger inner radius than the sideplate 3.

I claim:

1. A brush seal comprising: first and second spaced apart members able to move relative to one another and defining between them a fluid flow channel; first and second sideplates attached to the first member, and extending towards the second member, the first sideplate extending further than the second sideplate towards the second member; a plurality of closely-packed bristles each having a first end secured between the two sideplates and a second end in contact with the second member so as to block fluid flow along said channel; a loading element arranged to urge a number of the bristles against the first sideplate with a force such that the bristles can still slide between the first sideplate and the element; and resilient means arranged to apply a force to the loading element, this force causing the loading element to urge the bristles against the first sideplate, the resilient means being provided by spring fingers having a first end secured to the second sideplate and a second end in contact with the loading element.

2. A brush seal as claimed in claim 1 in which the loading element is provided with structure defining an aperture passing through said loading element.

3. A brush seal as claimed in claim 1 where a single loading element is arranged to urge all of the bristles against the first sideplate.

4. A brush seal as claimed in claim 1 in which the first member surrounds the second member and the first and second members are adapted to rotate relative to one another.

5. A brush seal comprising: first and second spaced apart members able to move relative to one another and defining between them a fluid flow channel; first and second sideplates attached to the first member, and extending towards the second member, the first sideplate extending further than the second sideplate towards the second member; a plurality of closely-packed bristles each having a first end secured between the two sideplates and a second end in contact with the second member so as to block fluid flow along said channel; and a loading element arranged to urge a number of the bristles against the first sideplate with a force such that the bristles can still slide between the first sideplate and the element, wherein said loading element is provided with structure defining an aperture passing through said loading element.

* * * * *